US009824000B1

(12) United States Patent
Babcock (10) Patent No.: US 9,824,000 B1
(45) Date of Patent: Nov. 21, 2017

(54) TESTING CALLING CODE DYNAMICALLY WITH RANDOM ERROR INJECTION BASED ON USER-SPECIFIED CONFIGURATION

(71) Applicant: Amazon Technologies, Inc., Reno, NV (US)

(72) Inventor: Trevor D. Babcock, Portland, OR (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 14/919,121

(22) Filed: Oct. 21, 2015

(51) Int. Cl.
*G06F 11/36* (2006.01)

(52) U.S. Cl.
CPC ...... *G06F 11/3684* (2013.01); *G06F 11/3688* (2013.01)

(58) Field of Classification Search
CPC ............ G06F 11/2025; G06F 11/3409; G06F 11/3051; G06F 9/45558; G06F 9/45533; G06F 9/455; G06F 2201/875; G06F 2201/86; G06F 2201/87; H04L 43/04; H04L 43/08; H04L 43/028
See application file for complete search history.

(56) References Cited

U.S. PATENT DOCUMENTS

| | | | | |
|---|---|---|---|---|
| 6,971,048 B1 * | 11/2005 | Hanson | ............... | G06F 11/3672 714/25 |
| 7,493,597 B2 | 2/2009 | Hefner | .......................... | 717/124 |
| 8,745,641 B1 * | 6/2014 | Coker | ................ | G06F 11/3668 719/313 |
| 8,756,569 B2 * | 6/2014 | Arcese | ................ | G06F 11/3676 717/124 |
| 8,868,981 B2 | 10/2014 | Glaser et al. | ................... | 714/45 |
| 8,910,294 B1 | 12/2014 | Sennett et al. | .................. | 726/25 |
| 9,015,532 B2 | 4/2015 | Hong | .......................... | 714/38.1 |
| 9,043,807 B2 | 5/2015 | Glazer et al. | | |
| 9,077,859 B2 | 7/2015 | Ahn | ............................. | 386/291 |
| 9,110,770 B1 | 8/2015 | Raju et al. | | |
| 2007/0208977 A1 * | 9/2007 | Clark | ............. | G01R 31/318569 714/728 |
| 2008/0134160 A1 * | 6/2008 | Belapurkar | ......... | G06F 11/3668 717/154 |

(Continued)

OTHER PUBLICATIONS

Izrailevsky, Yury et al., "The Netflix Simian Army", The Netflix Tech Blog, <http://techblog.netflix.com/2011/07/netflix-simian-army.html> Jul. 19, 2011, 2 pages.

(Continued)

*Primary Examiner* — Nadeem Iqbal
(74) *Attorney, Agent, or Firm* — Hogan Lovells US LLP (57) ABSTRACT

An apparatus includes a non-volatile storage medium and a processing circuit. The non-volatile storage medium stores code implementing an application program. The processing circuit may be configured to load and execute the code implementing the application program. At least a portion of the code implementing the application program is modified by the processing circuit to inject random errors in responses to requests from at least one calling program while an original definition of a functionality of the modified portion of the code implementing the application program remains unaltered. A particular random error injected is determined in response to configuration information received from a user.

20 Claims, 8 Drawing Sheets

(56) References Cited

U.S. PATENT DOCUMENTS

| | | | |
|---|---|---|---|
| 2008/0307258 A1* | 12/2008 | Challenger | G06F 11/1438 |
| | | | 714/20 |
| 2013/0152047 A1 | 6/2013 | Moorthi et al. | 717/124 |
| 2013/0185596 A1* | 7/2013 | Masser | G06F 11/3632 |
| | | | 714/38.1 |
| 2014/0075242 A1 | 3/2014 | Dolinia et al. | 714/27 |
| 2014/0337674 A1* | 11/2014 | Ivancic | H04L 43/50 |
| | | | 714/43 |
| 2016/0004630 A1* | 1/2016 | Masser | G06F 11/3672 |
| | | | 717/124 |
| 2016/0011961 A1* | 1/2016 | Kalayci | G06F 11/3696 |
| | | | 717/127 |

OTHER PUBLICATIONS

Brodkin, Jon, "Netflix Attacks Own Network With 'Chaos Monkey'—And Now You Can Too", arstechnica.com, <http://arstechnica.com/information-technology/2012/07/netflix-attack . . . >, Jul. 30, 2012, 2 pages.

\* cited by examiner

```
CLASS ORDER
  DEF PROCESS
    RANDOMLY_RAISE_EXCEPTION
    PUTS "PROCESSING ORDER!"
    # OTHER CODE HERE
  END
END
```

402 START

404 WITHOUT OVERWRITING OR LOSING ORIGINAL METHOD DEFINITIONS AND FUNCTIONALITY, REDEFINE METHODS ON CLASSES AT RUNTIME SUCH THAT EACH METHOD RUNS SOME EXTRA FUNCTIONALITY (E.G., WHICH RANDOMLY RAISES SPECIFIED EXCEPTIONS AT SPECIFIED FREQUENCIES), THEN RUNS ORIGINAL FUNCTIONALITY OF METHOD. IF NO EXCEPTIONS ARE RAISED, THE ORIGINAL FUNCTIONALITY EXECUTES AS NORMAL

406 TEST OPERATION OF APPLICATION BY RUNNING REDEFINED METHODS

408 END

TESTING CALLING CODE DYNAMICALLY WITH RANDOM ERROR INJECTION BASED ON USER-SPECIFIED CONFIGURATION

FIELD OF THE INVENTION

The present invention relates to application program testing generally and, more particularly, to a method and/or architecture for testing calling code dynamically with random error injection based on a user-specified configuration.

BACKGROUND OF THE INVENTION

Application software development often involves integrating an application program to an application programming interface (API) or a library. An API is a set of programming instructions and standards for accessing a software application. A software company releases an API to the public so that other software developers can design products that use the services provided by the application software of the software company. A library is a number of standard built-in functions that are grouped together and placed in a common place. Instead of writing code to perform standard operations, software developers use calls to the library functions to carry out various useful tasks. For example, input and output operations, math operations, etc. are typically implemented by library functions. Software designers need to test their software for issues associated with calls to APIs and library functions, particularly issues that could result in errors or downtime. Such testing is especially important for an application that supports a multi-billion dollar business.

It would be desirable to implement a method and/or architecture for testing calling code dynamically with random error injection based on a user-specified configuration.

SUMMARY OF THE INVENTION

The present invention concerns an apparatus including a non-volatile storage medium and a processing circuit. The non-volatile storage medium stores code implementing an application program. The processing circuit may be configured to load and execute the code implementing the application program. At least a portion of the code implementing the application program is modified by the processing circuit to inject random errors in responses to requests from at least one calling program while an original definition of a functionality of the modified portion of the code implementing the application program remains unaltered. A particular random error injected is determined in response to configuration information received from a user.

The objects, features and advantages of the present invention include providing a method and/or architecture for testing calling code dynamically with random error injection based on a user-specified configuration that may (i) allow real time testing of calling code exception handling during interactions with application programming interfaces (APIs), (ii) allow real time testing of calling code exception handling during interactions with library functions, (iii) work with any code that uses classes, (iv) avoid making actual code changes to existing programs for compatibility to support testing, (v) redefine methods and classes programmatically at runtime, (vi) redefine as many or as few classes and methods as a user selects, (vii) randomly raise as many exceptions as a user desires, (viii) allow a user to specify type and frequency of each exception raised, (ix) execute an original definition of a method when an exception is not raised, (x) use a closure to maintain reference to original definition of redefined method, and/or (xi) be implemented in one or more application instances on one or more computers.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

In various embodiments, the present invention may be implemented with an apparatus that is either stand alone or communicates across a network with other apparatus. While the present invention may be useful when used in conjunction with an application programming interface (APT) that communicates across a network, communication across a network is not necessary to practice an embodiment of the invention. For example, various embodiments of the present invention may be used with a library and/or an API that communicates with another part (e.g. application, etc.) running on the same host implementing the embodiment of the invention.

Various embodiments of the present invention may be described abstractly with reference to four main components: (1) an element that provides a service, provides information, or performs some function (e.g., web server, database, separate application running on the same host, etc.); (2) an abstraction layer of the element (e.g., API) that allows use of or interaction with the element; (3) an application that uses the abstraction layer; and (4) an exception simulator implemented in accordance with an embodiment of the invention. The exception simulator may be configured to raise (inject) exceptions randomly in the abstraction layer (2). An example is described below (in connection with FIG. 1) illustrating component (1) implemented as an internal database providing baseball statistics. Another example is described below (in connection with FIG. 2) illustrating component (1) implemented as an external server providing baseball statistics. In some embodiments, components (1) and (2) may be combined into one element. An example is described below (in connection with FIG. 3) illustrating components (1) and (2) implemented as a library.

Figure 1:
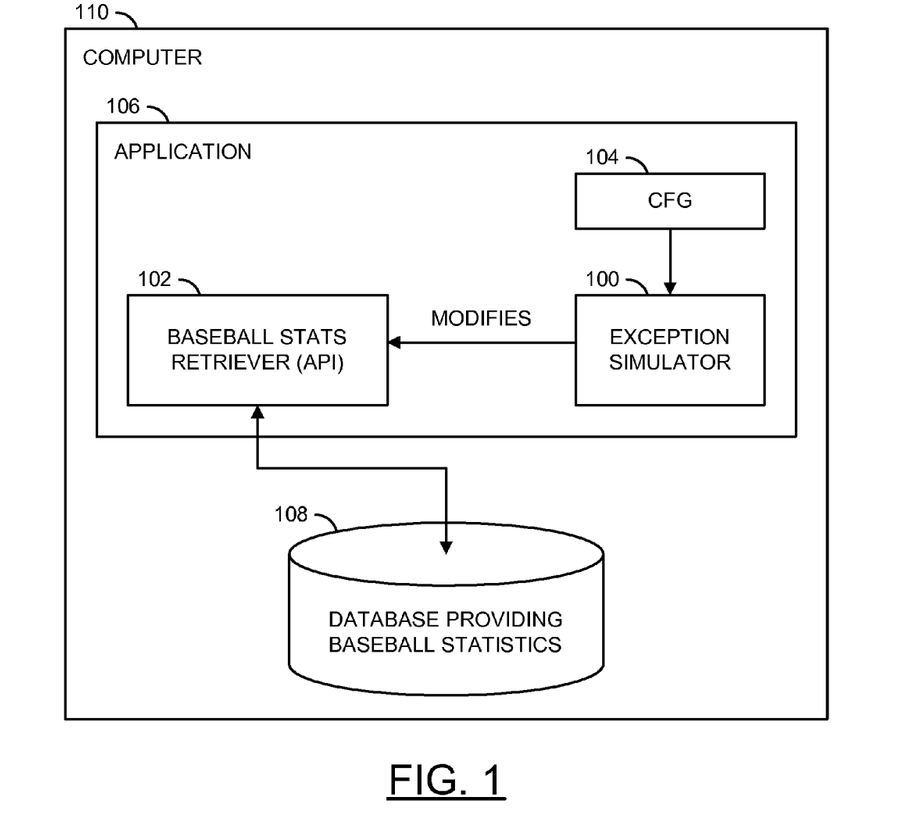
FIG. 1 is a diagram illustrating an application program including an example embodiment of the present invention.

Referring to FIG. 1, a diagram is shown illustrating an example embodiment of the present invention. In various embodiments of the present invention, a host computer may run an application with an application programming interface (API) that loads an exception simulator implemented in accordance with an example embodiment of the present invention, where the API communicates with a service that is internal to the host computer. For example, an exception simulator 100 implemented in accordance with an example embodiment of the present invention may be used to modify an existing application programming interface (API) 102 to randomly inject (issue) exceptions based upon configuration information 104. An application program 106 utilizing the API 102 may be tested to determine how well the application program 106 handles the exceptions. In one example, the API 102 may implement an abstraction layer for an internal database 108 that is part of a computer 110 running the application 106. For example, the database 108 may be configured to provide baseball statistics and the API 102 may implement a baseball statistics retriever enabling the application 106 to obtain baseball statistics from the database 108.

In various embodiments, the exception simulator 100 may redefine already-existing methods on already-existing classes of the API 102 to potentially (e.g., randomly) raise particular exceptions (errors) at a predetermined frequency. The particular method(s) redefined, the particular type(s) of exception(s) raised, and/or the particular frequency with which the particular exception(s) is(are) raised may be configured by a user programming the configuration information 104 (e.g., using a configuration hash). The purpose of redefining methods to randomly raise exceptions is not to test the already-existing methods of the API 102 themselves, but rather to test code of the application 106 that calls the methods of the API 102. A process in accordance with an example embodiment of the present invention generally allows a user to test how calling code handles various randomly arising exceptions (errors).

Figure 2:
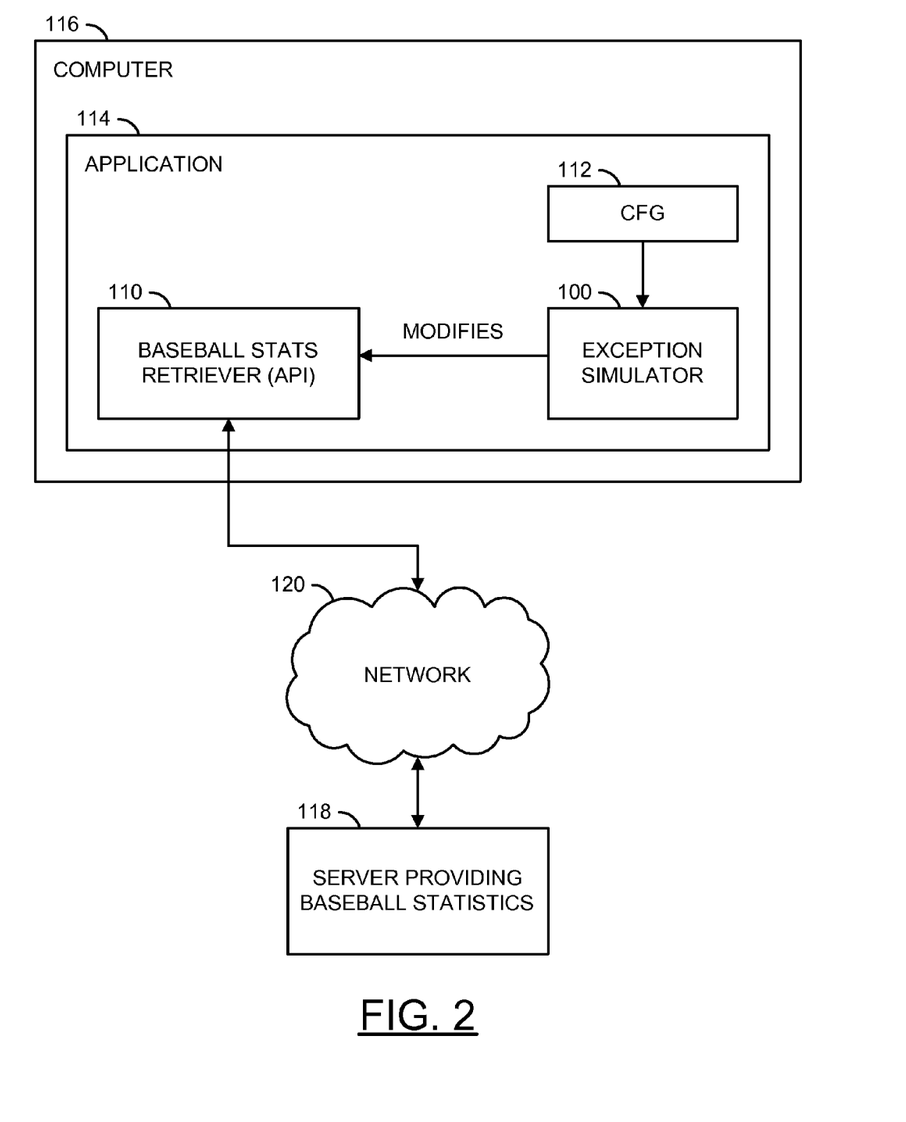
FIG. 2 is a diagram illustrating an application program including another example embodiment of the present invention.

Referring to FIG. 2, a diagram is shown illustrating another example embodiment of the present invention. In various embodiments of the present invention, a host computer may run an application with an application programming interface (API) that loads the exception simulator implemented in accordance with an example embodiment of the present invention, where the API communicates with an external host via a network. For example, the exception simulator 100 implemented in accordance with an example embodiment of the present invention may be used to modify an existing application programming interface (API) 110 to randomly inject (issue) exceptions based upon configuration information 112. An application program 114 utilizing the API 110 may be tested to determine how well the application program 114 handles the exceptions. In one example, a computer 116 running the application 114 may be connected to an external server 118 via a network 120. The API 110 may implement an abstraction layer for the external server 118. For example, the external server 118 may be configured to provide baseball statistics and the API 110 may implement a baseball statistics retriever enabling the application 114 to obtain baseball statistics from the external server 118 across the network 120.

In various embodiments, the exception simulator 100 may redefine already-existing methods on already-existing classes of the API 110 to potentially (e.g., randomly) raise particular exceptions (errors) at a predetermined frequency. The particular method(s) redefined, the particular type(s) of exception(s) raised, and/or the particular frequency with which the particular exception(s) is(are) raised may be configured by a user programming the configuration information 112 (e.g., using a configuration hash). The purpose of redefining methods to randomly raise exceptions is not to test the already-existing methods of the API 110 themselves, but rather to test code of the application 114 that calls the methods of the API 110. A process in accordance with an example embodiment of the present invention generally allows a user to test how calling code handles various randomly arising exceptions (errors).

Figure 3:
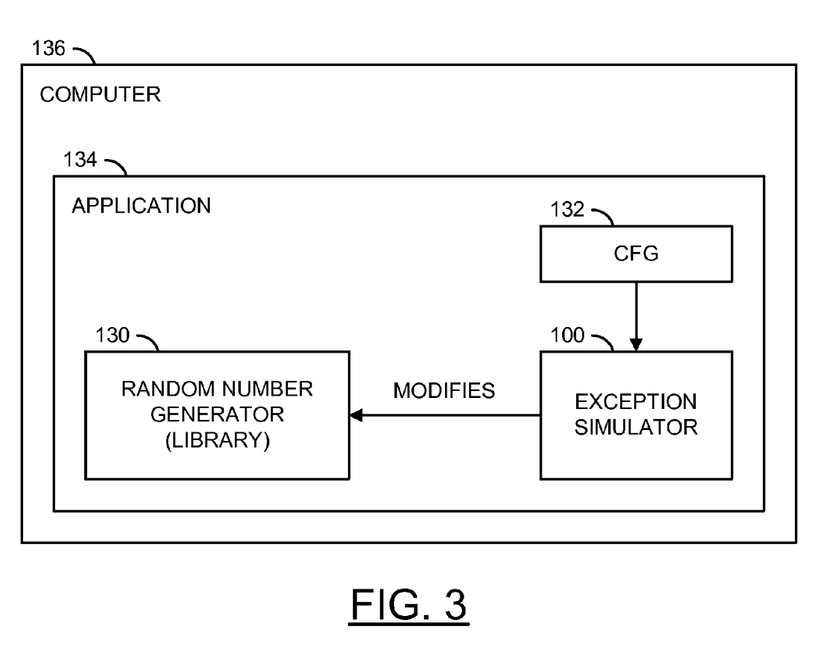
FIG. 3 is a diagram illustrating an application program including yet another example embodiment of the present invention.

Referring to FIG. 3, a diagram is shown illustrating yet another example embodiment of the present invention. In various embodiments of the present invention, a host computer may run an application that loads a library and the exception simulator implemented in accordance with an example embodiment of the present invention, where the library provides a number of standard built-in functions that are grouped together and placed in a common place. For example, the exception simulator 100 implemented in accordance with an example embodiment of the present invention may be used to modify an existing library 130 to randomly inject (issue) exceptions based upon configuration information 132. In one example, the library 130 may provide a random number generator. An application program 134 running on a computer 136 and utilizing the library 130 (e.g., to generate random numbers) may be tested to determine how well the application program 134 handles the exceptions.

In various embodiments, the exception simulator 100 may redefine already-existing methods on already-existing classes of the library 130 to potentially (e.g., randomly) raise particular exceptions (errors) at a predetermined frequency. The particular method(s) redefined, the particular type(s) of exception(s) raised, and/or the particular frequency with which the particular exception(s) is(are) raised may be configured by a user programming the configuration information 132 (e.g., using a configuration hash). The purpose of redefining methods to randomly raise exceptions is not to test the already-existing methods of the library 130 themselves, but rather to test code of the application 134 that calls the methods of the library 130. A process in accordance with an example embodiment of the present invention generally allows a user to test how calling code handles various randomly arising exceptions (errors).

Figure 4:
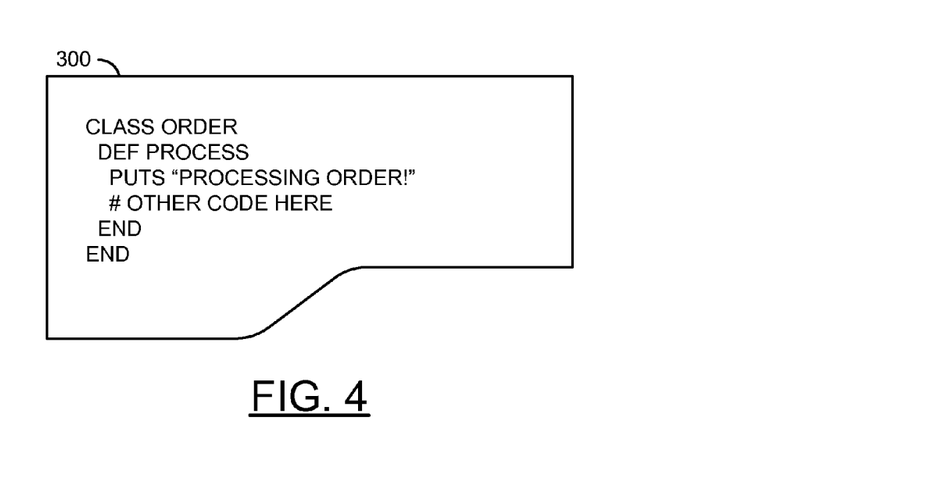
FIG. 4 is a diagram illustrating an example routine of an application programming interface prior to modification in accordance with an example embodiment of the present invention.

Referring to FIG. 4, a diagram is shown illustrating an example routine of an application program 300 (e.g., an application programming interface, etc.) prior to modification in accordance with an example embodiment of the present invention. In one example, an already-existing method "process" of the application program 300 may be illustrated by the pseudo-code shown in FIG. 4. The 'process' method is defined on a class "Order". When executed, the 'process' method first prints the line "Processing order!"

followed by a carriage return to a display and then performs any code following the puts command (e.g., represented by #other code here).

Figure 5:
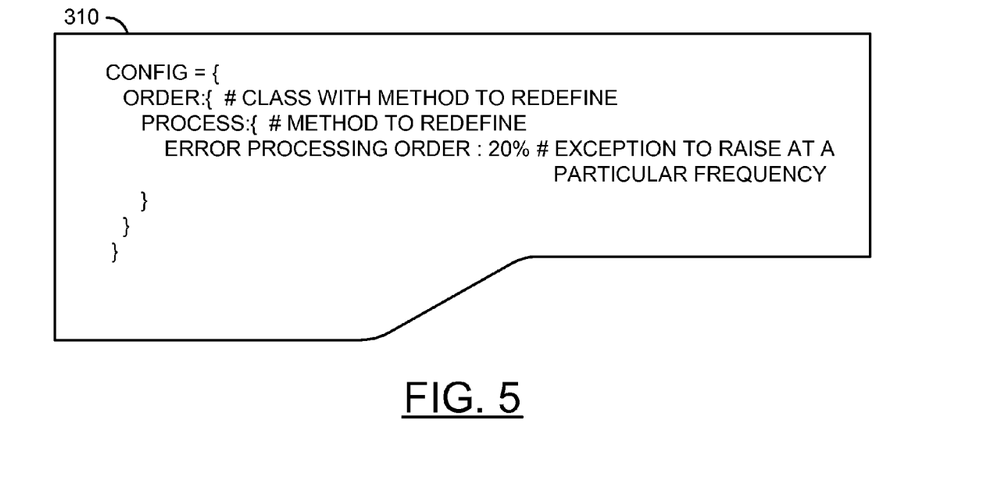
FIG. 5 is a diagram illustrating an example routine for redefining a method to inject random exceptions in accordance with an example embodiment of the present invention.

Referring to FIG. 5, a diagram is shown illustrating an example routine for injecting exceptions in accordance with an example embodiment of the present invention. In various embodiments, a program (e.g., a Ruby gem) 310 may be used to redefine already-existing methods on already-existing classes to potentially raise particular exceptions at a predefined frequency. In one example, a Ruby gem for redefining the 'process' method shown in FIG. 4 may be illustrated by the pseudo-code shown in FIG. 5. By specifying a simple configuration like the one illustrated in FIG. 5, the 'process' method on the 'Order' class may be redefined to randomly raise an exception. With this gem, many classes and methods in a program may be modified to randomly raise exceptions. The program may then be run as normal or in a test environment and the results may be observed. The randomness of the exceptions being thrown in many ways mimics the behavior of real systems, where problems can arise seemingly at random. Being able to mimic this chaotic behavior allows a program to be holistically tested and tested in more realistic circumstances.

Figure 6:
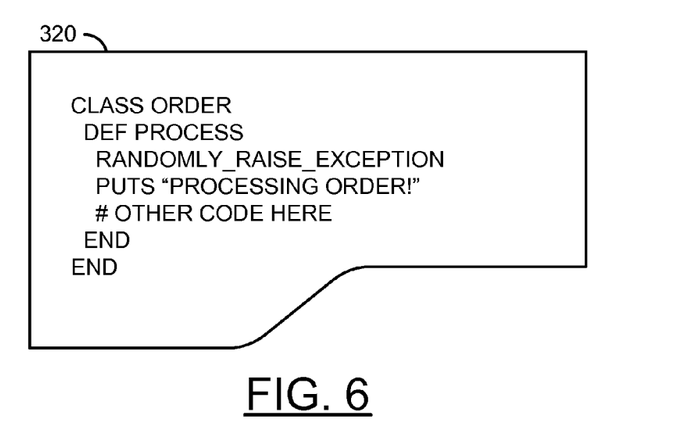
FIG. 6 is a diagram illustrating a second version of the routine of FIG. 4 after being modified to simulate random exceptions in accordance with an example embodiment of the present invention.

Referring to FIG. 6, a diagram is shown illustrating a second (modified) version 320 of the routine of FIG. 4 after being redefined by the configuration routine of FIG. 5. In one example, the 'process' method on the 'Order' class may be redefined to include an added functionality or method randomly_raise_exception. In one example, the 'randomly_raise_exception' method may be configured to have a 20% chance to raise the ErrorProcessingOrder exception. If the exception is not raised, the normal definition of the 'process' method executes. The original definition of the 'process' method (e.g., #other code here) is not overwritten or lost when the 'process' method is redefined (modified) to include the exception simulation in accordance with an embodiment of the invention.

Figure 7:
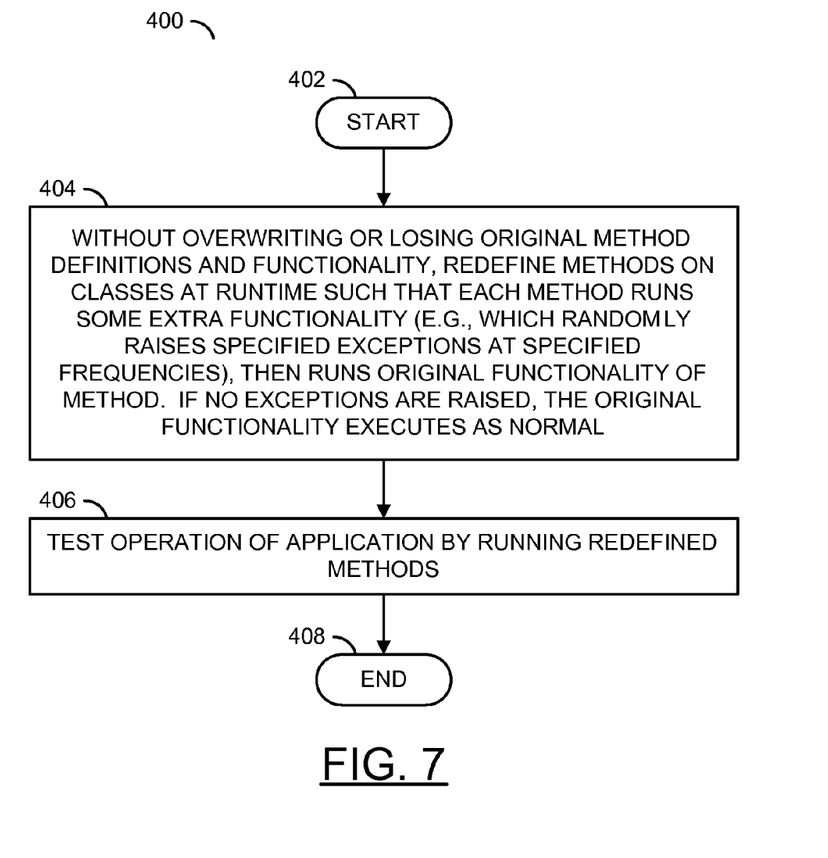
FIG. 7 is a diagram illustrating a process in accordance with an example embodiment of the present invention.

Referring to FIG. 7, a flow diagram is shown illustrating a process in accordance with an example embodiment of the present invention. In one example, a process 400 may be implemented to modify (e.g., redefine) one or more methods (e.g., of an application programming interface (API), etc.) based on a user-specified configuration to test calling code dynamically with random error injection. In one example, the process (or method) 400 may comprise a step (or state) 402, a step (or state) 404, a step (or state) 406, and a step (or state) 408. The process 400 may start in the step 402. In the step 404, the process 400 may redefine one or more methods on one or more classes at runtime. The one or more methods are redefined without overwriting or losing original method definitions and functionality. Upon being redefined, the one or more redefined methods either run some extra functionality that randomly raises exceptions or, if no exception is raised, run the original functionality of the method as normal (e.g., as if the method had not been redefined). The specific methods redefined, the specific exceptions raised, and/or a frequency with which each specific exception is raised are configurable by a user (e.g., by entering a configuration hash, etc.).

Once the specific methods on the specific classes have been redefined, the process 400 may move to the step 406. In the step 406, the redefined methods are executed to test operation of the application. The redefining of the particular methods to randomly raise the specific exceptions does not test the methods themselves, but rather allows the user to test the code that calls each method. In particular, the user is able to test how the calling code handles the redefined method that is randomly raising various exceptions. When the user is finished testing the calling code, the process 400 may move to the step 408 and terminate.

Figure 8:
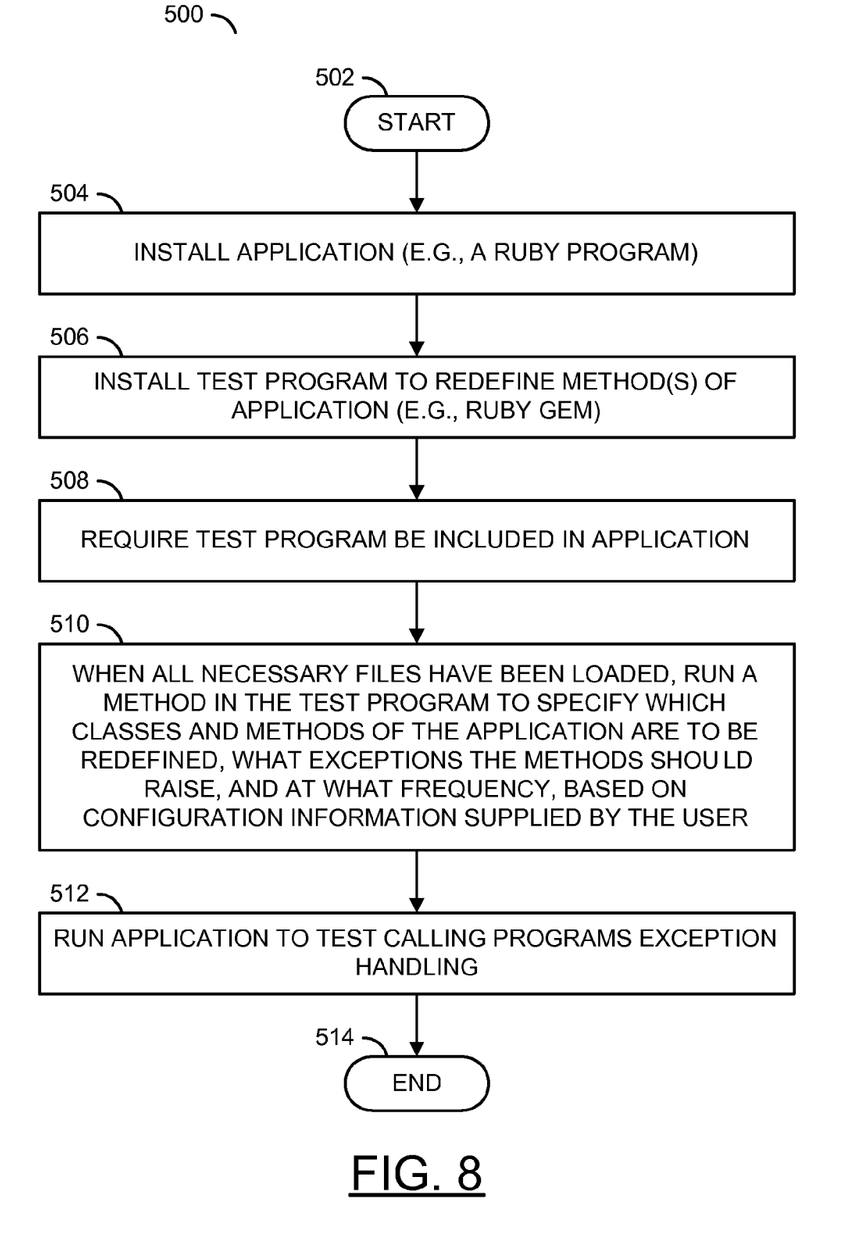
FIG. 8 is a diagram illustrating another process in accordance with an example embodiment of the present invention.

Referring to FIG. 8, a flow diagram is shown illustrating another process in accordance with an embodiment of the present invention. In one example, a process 500 may be implemented to modify (e.g., redefine) one or more methods of an already existing program (e.g., an application programming interface (API), etc.) to test calling code dynamically with random error injection based on a user-specified configuration. In one example, the process (or method) 500 may comprise a step (or state) 502, a step (or state) 504, a step (or state) 506, a step (or state) 508, a step (or state) 510, a step (or state) 512, and a step (or state) 514. The process 500 may start in the step 502. In the step 504, the process 500 installs an application program, such as an application programming interface (API), onto a system for execution (e.g., the application program code may be loaded from a storage device into a system buffer). In the step 506, the process 500 installs a test program, such as a Ruby GEM, onto a system for execution along with the application program (e.g., the test program code may be loaded from a storage device into another system buffer).

In the step 508, the user includes (e.g., bundles) the test program with the application program. When all necessary files have been loaded, the process 500 moves to the step 510. In the step 510, the process 500 runs a method (or subroutine or sub program) in the test program to specify (i) which portions (e.g., classes, methods, etc.) of the application program are to be redefined to randomly raise exceptions, (ii) which specific exceptions are to be raised, and (iii) a frequency with which each specific exception is to be raised based upon configuration information provided by the user. The specified portions of the application program are redefined without overwriting or losing original method definitions and functionality. Upon being redefined, the portions of the application program are enabled to either run some extra functionality that randomly raises an exception or, if no exception is to be raised, run the original functionality as normal (e.g., as if the application program had not been modified). The specific methods redefined, the specific exceptions raised, and/or a frequency with which each specific exception is raised are configurable by a user (e.g., by entering a configuration hash, etc.).

When the specified portions of the application program have been redefined, the process 500 moves to the step 512. In the step 512, the modified application program is executed to test exception handling capabilities of one or more programs calling the application. The redefining of the particular portions of the application program to randomly raise the specific exceptions does not test the particular portions of the application program themselves, but rather allows the user to test the code that calls each particular portion of the application program. In particular, the user is able to test how the calling code handles the redefined portion(s) of the application program that is(are) randomly raising various exceptions. When the user is finished testing the calling code, the process 500 may move to the step 514 and terminate.

In general, a process implemented in accordance with an embodiment of the invention allows a user to test how the calling code handles the redefined method that is randomly raising various exceptions. In various embodiments, the process uses a closure to keep the original definition of the redefined method in memory without polluting the class (or some other object) with the old definitions. In the context of programming, a closure is a function/method that (i) can be passed around like an object (to be called later) and (ii) remembers the values of all variables that were in scope when the function/method was created. The function/method is able to access those variables when the function/method is called even though the variables may no longer be in scope. A closure retains knowledge of the lexical environment at the time the closure was defined. Although the example implementation presented above is illustrated using Ruby, a similar program could be written in many different languages (e.g., JavaScript, Swift, Objective-C, etc.) using the same principles. Closures in Ruby and Swift are similar to blocks in C and Objective-C and to lambdas in other programming languages.

In various embodiments, the testing of behavior is accomplished by redefining methods on classes at runtime. However, the original definition and functionality of the methods are not overwritten or lost. Instead, the methods are generally redefined to run some extra functionality, then run the original functionality of the method as well. The extra functionality is generally a method that randomly raises the specified exceptions at the specified frequency. If no exceptions are raised, the original functionality executes as normal.

To use a gem implementing a test program in accordance with an embodiment of the invention in a Ruby program, a user would install the gem and bundle the gem with the Ruby program. Then, at a point in the Ruby program where all necessary files have been loaded, a method in the gem would be run and passed a configuration hash. The configuration hash specifies which classes and methods should be redefined, what exceptions the methods should raise, and at what frequency. In various embodiments, the configuration step should be executed before any of the classes-to-be-redefined are actually used (e.g., during program initialization).

Figure 9:
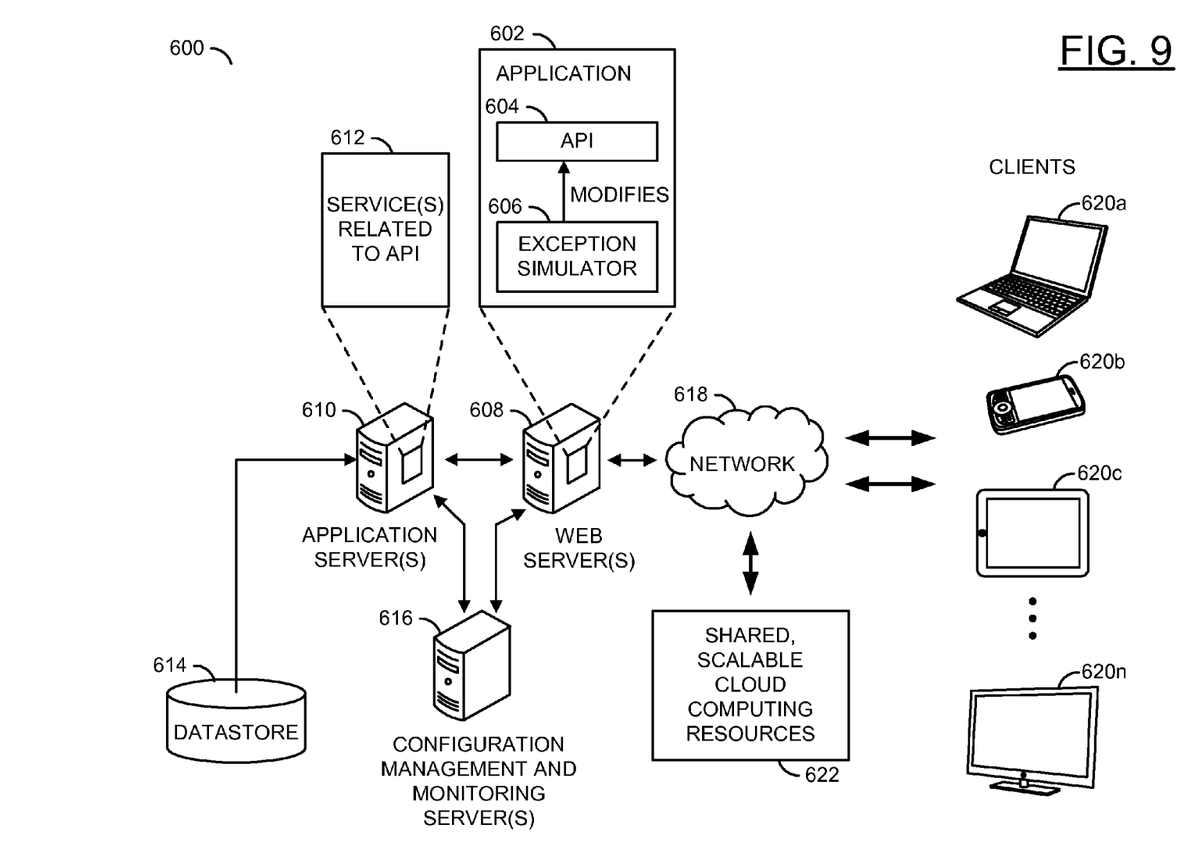
FIG. 9 is a diagram illustrating a context in which an application in accordance with an example embodiment of the present invention may be implemented.

Referring to FIG. 9, a diagram is shown illustrating a system 600 in which an embodiment of the present invention may be implemented. In one example, the system 600 may implement an application 602 with an application programming interface (API) 604 that loads an exception simulator 606 implemented in accordance with an example embodiment of the present invention. One or more computers 608 running the application 602 may be connected to one or more computers 610. In one example, the computers 608 may be implemented as web servers and the computers 610 may be implemented as application servers. The API 604 may implement an abstraction layer for one or more services 612 provided by the computer(s) 610. For example, the computers 610 may be configured to provide information (e.g., baseball statistics, etc.) and the API 604 may implement a baseball statistics retriever enabling the application 602 to obtain baseball statistics from the computers 610. In one example, the computers 610 may run an application with an API that retrieves the information from a datastore 614.

In various embodiments, the exception simulator 606 may redefine already-existing methods on already-existing classes of the API 604 to potentially (e.g., randomly) raise particular exceptions (errors) at a predetermined frequency. The particular method(s) redefined, the particular type(s) of exception(s) raised, and/or the particular frequency with which the particular exception(s) is(are) raised may be configured by a user (e.g., using a configuration hash). In one example, the user may configure the exception simulator 606 and test the application 602 using a configuration management and monitoring server 616, which may be connected to the computers 608 and 610. The purpose of redefining methods to randomly raise exceptions is not to test the already-existing methods of the API 606 themselves, but rather to test code of the application 602 that calls the methods of the API 606. A process in accordance with an example embodiment of the present invention generally allows a user to test how calling code handles various randomly arising exceptions (errors). Applications running on the computers 610 may be tested similarly.

In one example, the datastore 614 may be implemented using one or more Amazon Elastic Block Store (EBS) volumes and/or Amazon Storage Service (Amazon S3). In various embodiments, the computer(s) 608, the computer(s) 610, the datastore 614, and the configuration management and monitoring server(s) 616 may be implemented as an Amazon Web Services (AWS) cloud. In some embodiments, the computer(s) 608, the computer(s) 610, the datastore 614, and the configuration management and monitoring server(s) 616 may be implemented as part of an Amazon Elastic Compute Cloud (EC2) instance. However, other cloud infrastructure configurations may be implemented accordingly to meet the design criteria of a particular application. In various embodiments, the system 600 may also include a network 618 (e.g., the Internet, etc.) connecting the computers 608 to a number of client devices 620a-620n. In some embodiments, the network 618 may also connect the computers 608 to additional scalable cloud computing resources 622.

Figure 10:
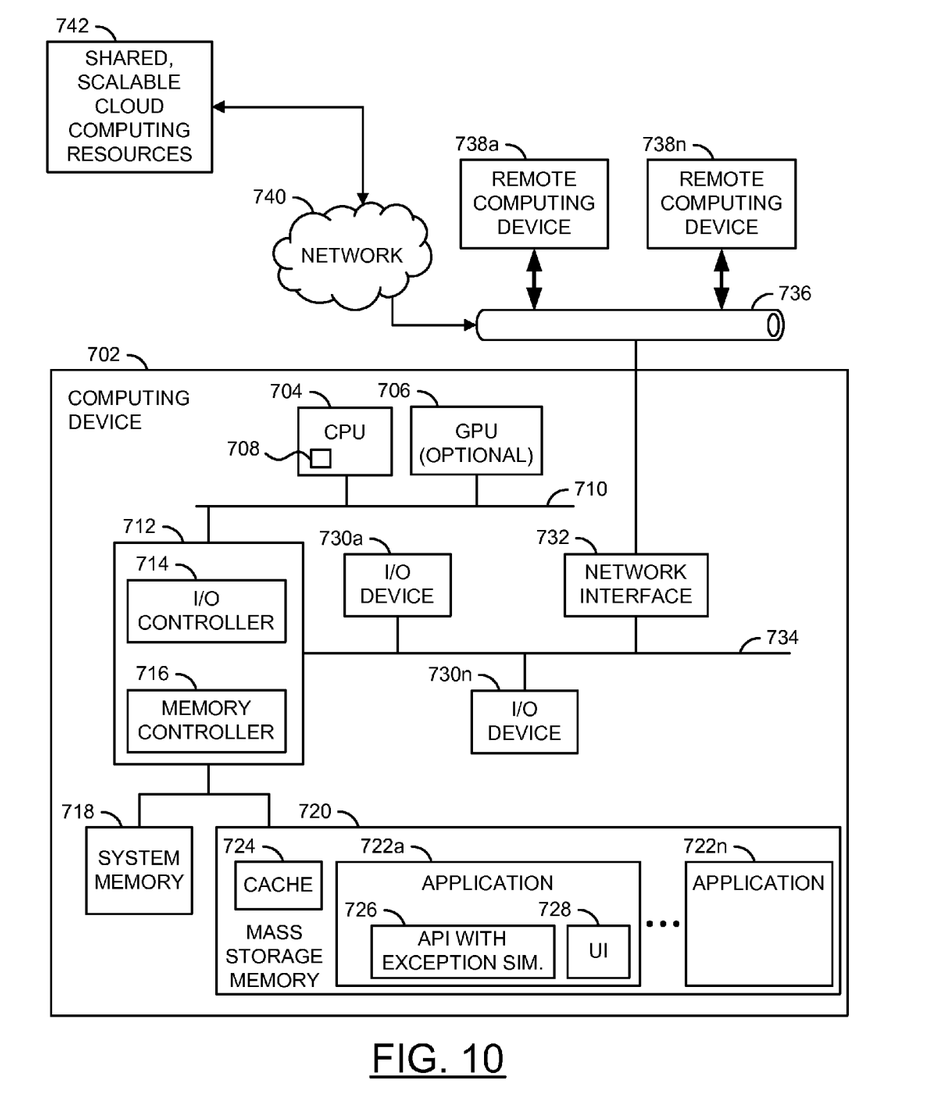
FIG. 10 is a diagram illustrating an example implementation of a computer implementing an application in accordance with an example embodiment of the present invention.

Referring to FIG. 10, a diagram is shown illustrating a system in which an application including an exception simulator in accordance with an example embodiment of the invention may be implemented. In one example, a system 700 may include an computer device 702. The computer device 702 may include a central processing unit (CPU) 704 and an optional graphics processing unit (GPU) 706. The CPU 704 may include a register file 708. The CPU 704 and the GPU 706 may be connected via a bus 710 to a controller 712. In one example, the controller 712 may include an input/output (I/O) controller 714 and a memory controller 716. The controller 712 may be connected to a system memory 718 (e.g., RAM, ROM, Flash, etc.) and a mass storage memory 720 (e.g., a hard drive (HDD), solid state drive (SSD), optical drive, etc.). The mass storage memory 720 may store a plurality of applications 722a-722n that may be loaded into the system memory 718 and executed by the CPU 704 and/or the GPU 706. In one example, the mass storage memory 720 may include a cache 724. The controller 712 may also be connected to a number of I/O devices 730a-730n and a network interface (NIC) 732 by a bus 734. The NIC 732 may connect the computer device 702 to a bus 736 that may connect with remote computing devices 738a-738n, a network 740, and/or cloud computing resources 742.

In one example, at least one of the applications 722a-722n may include an application programming interface 726 that is redefined by an exception simulation process in accordance with an embodiment of the invention when loaded and executed. In one example, the exception simulation process may be configured in response to a user input 728 to modify the application programming interface 726 to randomly inject specific types of exceptions (errors) when specific methods are called by the application. A frequency with which the specific types of exceptions are injected may also be configured in response to the user input 728. In one example, the user input 728 may comprise a configuration hash.

In various embodiments, the present invention provides a versatile solution that works with any code (e.g., Ruby, etc.) that uses classes. A test process in accordance with an embodiment of the invention is generally unintrusive because the test process does not actually make any compatibility code changes to an existing program to test (e.g., methods and classes are redefined programmatically at runtime). As many or as few classes and methods may be redefined as the user desires. Methods may be redefined to randomly raise as many exceptions as the user chooses. The user may specify that different exceptions be raised at different frequencies. In some embodiments, a process in accordance with an embodiment of the invention may be implemented as a part of a larger testing solution, especially an automated or continuous testing solution.

While the invention has been particularly shown and described with reference to the preferred embodiments thereof, it will be understood by those skilled in the art that various changes in form and details may be made without departing from the scope of the invention.

The invention claimed is:

1. An apparatus comprising:
a non-volatile storage medium storing code implementing an application program; and
a processing circuit configured to load and execute said code implementing said application program, wherein:
at least a portion of said code implementing said application program is modified by said processing circuit to inject random errors in responses to requests from at least one calling program while an original definition of a functionality of the modified portion of the code implementing the application program remains unaltered;
a particular random error injected is determined in response to configuration information received from a user; and
an exception simulator program included in the application program is executed by said processing circuit to specify portions of the code implementing the application program to be redefined to randomly raise exceptions.

2. The apparatus according to claim 1, wherein the portion of the code implementing the application program that is modified comprises at least one of an application programming interface and a library.

3. The apparatus according to claim 1, wherein said application programming interface implements an abstraction layer representing at least one of an internal service of said apparatus and a service provided by an application server external to said apparatus.

4. The apparatus according to claim 3, wherein said apparatus is connected to said application server by a network.

5. The apparatus according to claim 3, wherein said application server is part of an Amazon Web Services cloud.

6. The apparatus according to claim 1, wherein said configuration information received from said user comprises one or more of (i) a particular type of random error to inject, (ii) a frequency with which said particular type of random error is injected, and (iii) a particular portion of said application program to be redefined.

7. The apparatus according to claim 1, wherein said processing circuit modifies said portion of said code implementing said application program by redefining one or more methods, one or more classes, or one or more methods and classes programmatically at runtime.

8. The apparatus according to claim 1, wherein said application program comprises a Ruby program and said processing circuit modifies said application program by executing a Ruby gem.

9. The apparatus according to claim 8, wherein said Ruby gem utilizes a closure to maintain an original definition of a functionality of the portion of said code implementing said application program that is modified by said processing circuit.

10. A method of testing calling code comprising the steps of:
modifying at least a portion of code implementing an application program running on a computer to inject random errors in responses to requests from said calling code while maintaining an original definition of a functionality of the portion of the code implementing the application program unaltered, wherein the random errors injected are determined in response to configuration information;
monitoring how said calling code handles said random errors injected in said responses;
loading an exception simulator program, the exception simulator program being included in the application program; and
running the exception simulator program to specify which portions of the code implementing the application program are to be redefined to randomly raise exceptions.

11. The method according to claim 10, wherein the portion of the code implementing the application program that is modified comprises at least one of an application programming interface and a library.

12. The method according to claim 11, wherein said application programming interface implements an abstraction layer representing at least one of an internal service of said computer and a service provided by an application server external to said computer.

13. The method according to claim 12, wherein said application server is part of an Amazon Web Services cloud.

14. The method according to claim 10, further comprising:
receiving said configuration information from a user, wherein said configuration information comprises one or more of (i) a particular type of random error to inject, (ii) a frequency with which said particular type of random error is injected, and (iii) a particular portion of said application programming interface to be redefined.

15. The method according to claim 14, further comprising:
modifying said particular portion of said code implementing said application program to randomly inject said particular type of random error with said frequency.

16. The method according to claim 10, further comprising:
utilizing a closure to maintain the original definition of the functionality of the portion of the code implementing said application program modified.

17. The method according to claim 10, wherein the portion of the code implementing the application program is modified by:
loading the application program and the exception simulator program;
including the exception simulator program in the application program; and
running the exception simulator program to specify which specific exceptions are to be raised, and a frequency with which each specific exception is to be raised based upon the configuration information, wherein the specified portions of the code implementing the application program are redefined without overwriting or losing original method definitions and functionality, and upon being redefined, the portions of the code implementing the application program are enabled to either run an extra functionality that randomly raises an exception or, if no exception is to be raised, run the original functionality as if no modification had been made.

18. A system comprising:
a first computer implementing an application server running at least one application program instance; and
a second computer implementing a control interface enabled to:
configure a method of the at least one application program instance running on said first computer to inject random exceptions in responses to requests received from a calling program while maintaining an original definition of the method of the at least one application program instance unaltered;
monitor how said calling program handles said random exceptions injected in said response;
load an exception simulator program, the exception simulator program being included in the application program; and
run the exception simulator program to specify which portions of the code implementing the application program are to be redefined to randomly raise exceptions.

19. The system according to claim 18, wherein said method communicates with at least one of an internal service of said first computer and a service provided by a third computer connected externally to said first computer.

20. The system according to claim 18, wherein said method is part of a library.

* * * * *